(12) United States Patent     (10) Patent No.: US 8,477,605 B2
Elliott et al.     (45) Date of Patent: Jul. 2, 2013

(54) PREVENTING ILLICIT COMMUNICATIONS

(75) Inventors: Stephen Bennett Elliott, Allen, TX (US); Larry DeWayne Lewis, Plano, TX (US)

(73) Assignee: Rockstar Consortium US LP, Plano, TX (US)

( * ) Notice: Subject to any disclaimer, the term of this patent is extended or adjusted under 35 U.S.C. 154(b) by 1878 days.

(21) Appl. No.: 10/954,049

(22) Filed: Sep. 29, 2004

(65) Prior Publication Data

US 2006/0067215 A1    Mar. 30, 2006

(51) Int. Cl.
    *G06F 11/00*     (2006.01)
(52) U.S. Cl.
    USPC ........... 370/230; 370/229; 370/231; 370/232; 370/395.2; 370/395.21
(58) Field of Classification Search
    USPC ............................ 370/229, 230, 326; 713/201
    See application file for complete search history.

(56) References Cited

U.S. PATENT DOCUMENTS

| | | | | |
|---|---|---|---|---|
| 5,884,025 | A * | 3/1999 | Baehr et al. | 726/13 |
| 6,122,665 | A * | 9/2000 | Bar et al. | 709/224 |
| 6,865,604 | B2 * | 3/2005 | Nisani et al. | 709/224 |
| 7,567,561 | B2 * | 7/2009 | Toumura | 370/389 |
| 2002/0067725 | A1 * | 6/2002 | Oguchi et al. | 370/390 |
| 2003/0043740 | A1 * | 3/2003 | March et al. | 370/229 |
| 2003/0149774 | A1 * | 8/2003 | McConnell et al. | 709/227 |
| 2004/0049699 | A1 * | 3/2004 | Griffith et al. | 713/201 |
| 2005/0188423 | A1 * | 8/2005 | Motsinger et al. | 726/22 |

FOREIGN PATENT DOCUMENTS

| | | |
|---|---|---|
| WO | WO 01/91389 A2 | 11/2001 |
| WO | WO 02/44844 A2 | 6/2002 |
| WO | WO 02/082763 A2 | 10/2002 |
| WO | WO 02/103982 A2 | 12/2002 |
| WO | WO 2004/023730 A2 | 3/2004 |

* cited by examiner

*Primary Examiner* — Joseph J Nguyen
(74) *Attorney, Agent, or Firm* — Withrow & Terranova, PLLC

(57) ABSTRACT

The present invention inspects packets to identify session initiation messages associated with select applications. A session initiation message may be any message used to initiate a communication session with another communication client. Once a session initiation message from a select application is identified, the intended communication session may be identified, monitored, prevented, or otherwise processed in a predefined manner. These select applications may be illicit applications from which communication sessions are actually or potentially unlawful or otherwise improper. The illicit communication sessions that the present invention seeks to control may be used for voice communications as well as for transferring data and facilitating application collaboration, such as is used in video conferencing or file sharing. The session initiation messages need not be received directly from the originating communication client for inspection. Packet inspections may take place at any location, such as aggregation points throughout the packet networks.

42 Claims, 5 Drawing Sheets

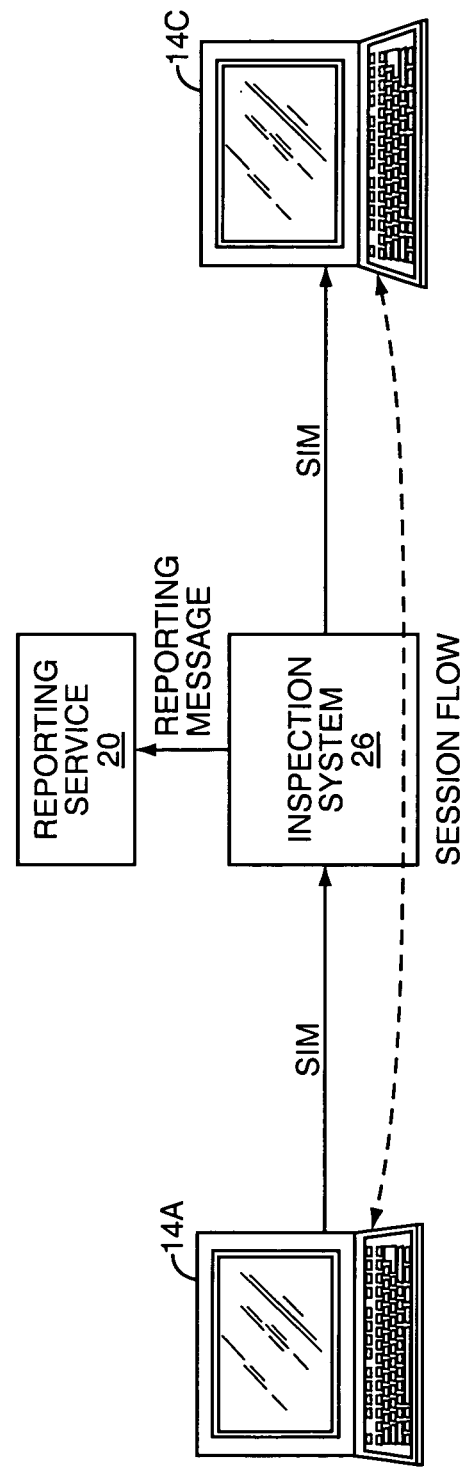

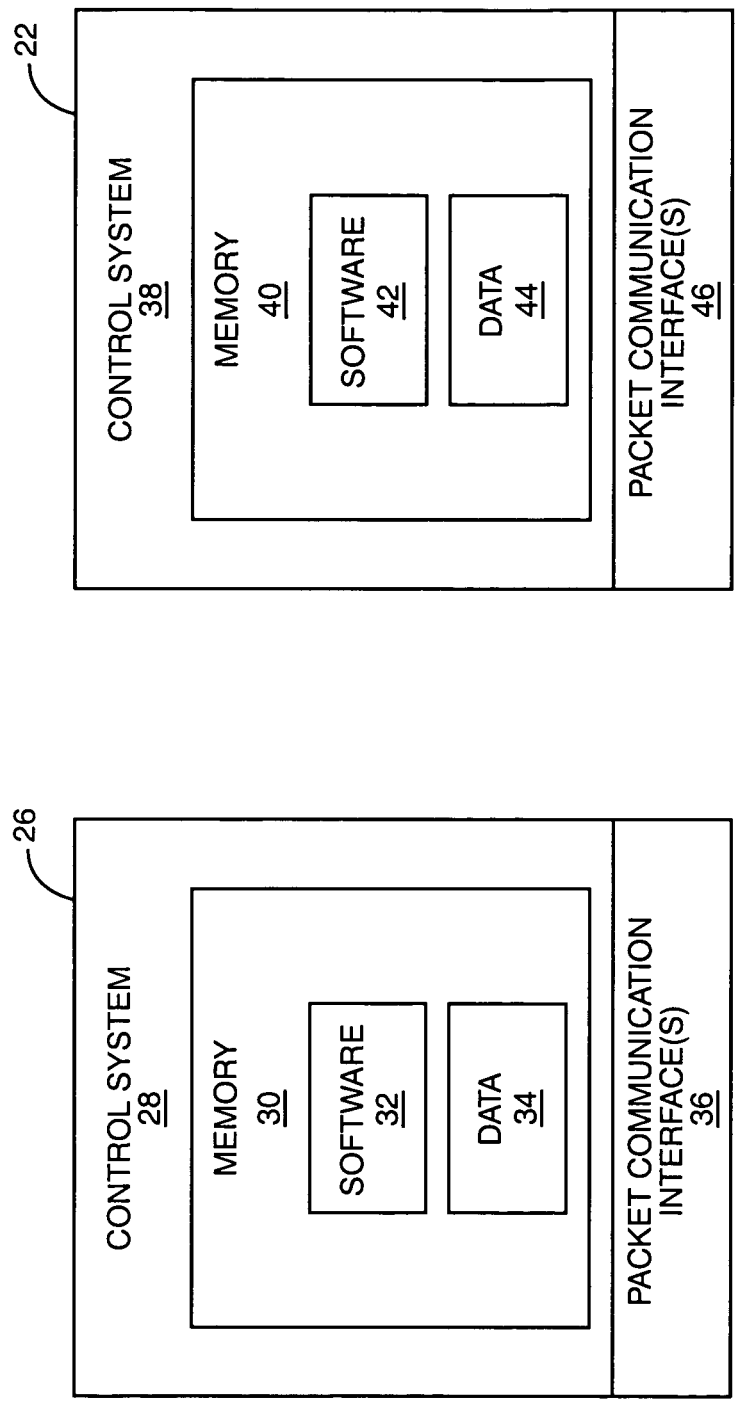

PREVENTING ILLICIT COMMUNICATIONS

FIELD OF THE INVENTION

The present invention relates to communications, and in particular to preventing illicit communications.

BACKGROUND OF THE INVENTION

Traditionally, circuit-switched networks, such as the Public Switched Telephone Network (PSTN), support a vast majority of communications that are predominantly voice based. For security reasons, telephone calls over circuit-switched networks could be readily monitored using various wiretapping or monitoring technologies by law enforcement agencies when illicit communications were suspected.

As packet networks, such as the Internet, evolve, the amount of voice-over-packet (VoP) communications has exponentially increased. As VoP communications increase, the need for a way to monitor these communication sessions increases. Unfortunately, the ability to encrypt these communication sessions often renders techniques to monitor the communication sessions obsolete, especially given the increasing sophistication of encryption techniques. As such, criminals and terrorists are finding the Internet to be a safe harbor for interstate, national, and international communications, which include data transfers, file sharing, and application collaboration, in addition to voice communications. Once a communication is established through the packet networks and any available firewalls or other monitoring entities, encrypted communications containing illicit content will often go undetected. Many of the encryption techniques are virtually unbreakable, and the resources necessary to decrypt, monitor, and detect illicit communications are often impractical or unavailable. These security threats pose risks to individuals and enterprises, as well as states and nations. Accordingly, there is a need for a technique to prevent establishment of sessions that may be used for illicit communications, prior to the communication sessions being established.

SUMMARY OF THE INVENTION

The present invention inspects packets to identify session initiation messages associated with select applications. A session initiation message may be any message used to initiate a communication session with another communication client. Once a session initiation message from a select application is identified, the intended communication session may be identified, monitored, prevented, or otherwise processed in a predefined manner. These select applications may be illicit applications from which communication sessions are actually or potentially unlawful or otherwise improper. The illicit communication sessions that the present invention seeks to control may be used for voice communications as well as for transferring data and facilitating application collaboration, such as is used in video conferencing or file sharing. The session initiation messages need not be received directly from the originating communication client for inspection. Packet inspections may take place at any location, such as aggregation points throughout the packet networks. The aggregation points are those at which most, if not all, traffic is routed when being transferred from one packet network or location to another. The aggregation points may include various types of routers, which act as gateways between local or regional packet networks, as well as those providing digital subscriber line, cable, and enterprise connectivity. The inspection system is applicable to pure packet, wireless, wireline, and enterprise networks.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 2A-2C illustrate three different scenarios in which communication sessions, which may be used for illicit communications, are either prevented, reported, or monitored, according to select embodiments of the present invention.

FIG. 4 is a block representation of an inspection system according to one embodiment of the present invention.

FIG. 5 is a block representation of a proxy according to one embodiment of the present invention.

DETAILED DESCRIPTION OF THE PREFERRED EMBODIMENTS

Figure 1:
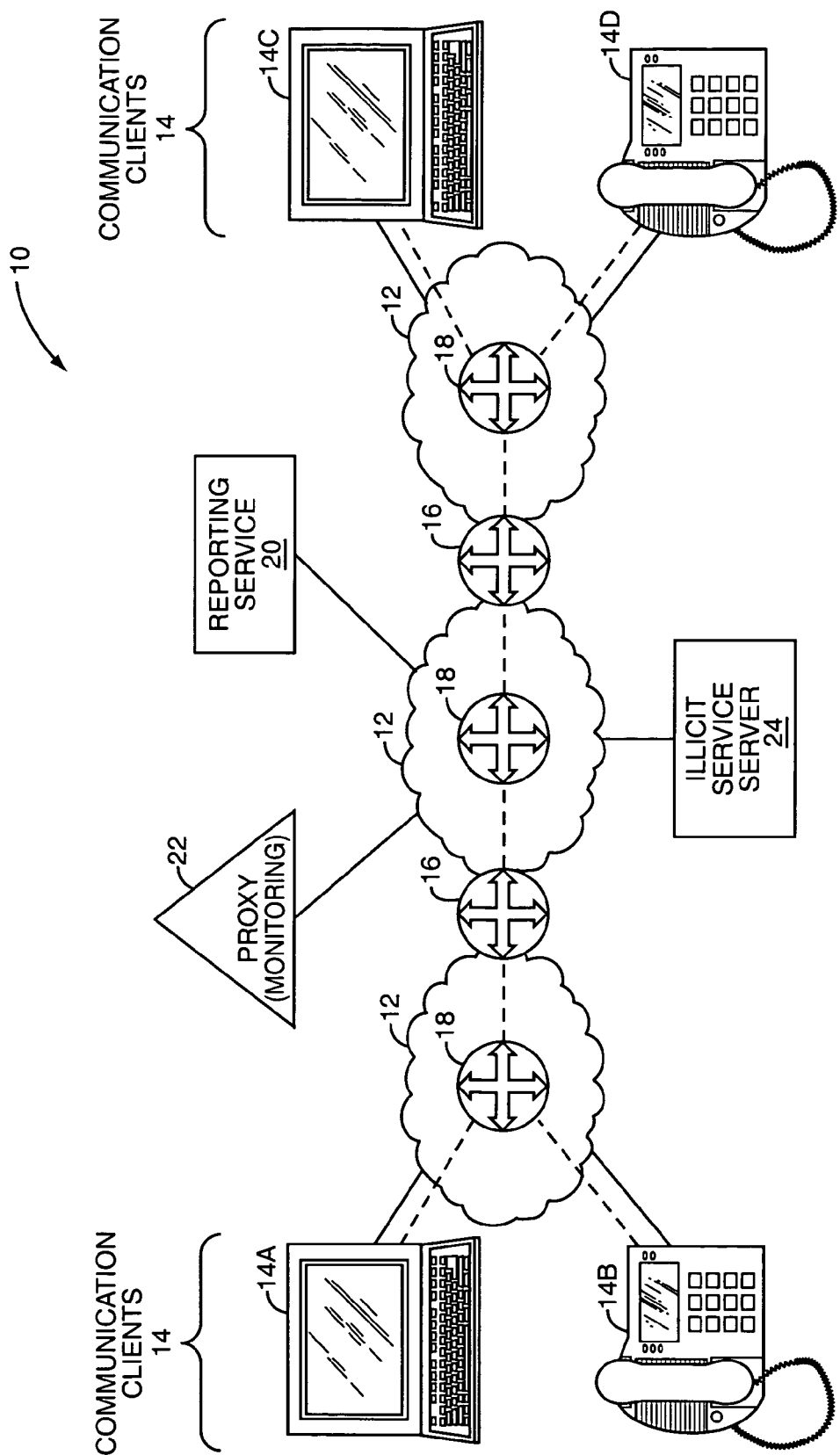
FIG. 1 is a block representation of a communication environment according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention inspects packets to identify session initiation messages associated with select applications. Once a session initiation message from a select application is identified, the intended communication session may be identified, monitored, prevented, or otherwise processed in a predefined manner. These select applications may be illicit applications from which communication sessions are actually or potentially unlawful or otherwise improper. The illicit communication sessions that the present invention seeks to control may be used for voice communications as well as for transferring data and facilitating application collaboration, such as is used in video conferencing or file sharing. Those skilled in the art will recognize other applications for using communication sessions. The present invention can be applied to all types of networks carrying packet traffic. These networks include pure packet, wireless, wireline, and enterprise networks.

A session initiation message may be any message used to initiate a communication session with another communication client. Notably, any number of messages may be needed to initiate a unidirectional or bidirectional communication session, and as such, a session initiation message need not be the first or initial message in a series of messages used to initiate a communication session. Further, the session initiation messages may be relayed and proxied through one or more devices over one or more packet networks. As such, the session initiation messages need not be received directly from the originating communication client for inspection. Packet inspections may take place at any location; however, inspecting packets at various aggregation points throughout the packet networks is most efficient. The aggregation points are those at which most, if not all, traffic is routed when being transferred from one packet network or location to another. The aggregation points may include various types of routers, which act as gateways between local or regional packet networks. For example, the aggregation points may be enterprise gateways, which connect an enterprise's local area network to a regional or national packet network forming part of the Internet. The aggregation points may also be national or international gateways that connect packet networks of different countries, continents, or other defined regions. The aggregation points may also act as firewalls or other filtering entities, as well as systems providing digital subscriber line, cable, and enterprise connectivity. Although implementation of the present invention in an aggregation point is beneficial, the inspection and processing of packets and communication sessions according to the present invention may take place in any type of system through which packet-based traffic, including session control messages as well as session traffic, are routed.

Turning now to FIG. 1, an exemplary communication environment 10 is illustrated and includes multiple packet networks 12 for facilitating packet-based communications between communication clients 14. These communication clients 14 may take many forms, such as personal computers (PCs) 14A and 14C, as well as voice-over-packet (VoP) telephony terminals 14B and 14D. Those skilled in the art will recognize other embodiments in which communication clients 14 may be implemented.

Gateway routers 16 are employed as aggregation points for facilitating communications between the packet networks 12. In general, all or most of the packet traffic traversing two or more packet networks 12 will be routed through a gateway router 16. In one embodiment of the present invention, the inspection function and associated processing may be implemented in the gateway router 16. These gateway routers 16 may be placed at enterprise, national, or international borders or at any other point at which packet networks 12 are connected.

Within each of the packet networks 12, many internal routers 18 will be employed to facilitate the routing of packet traffic throughout a given packet network 12. In another embodiment of the present invention, the inspection function and associated processing may be employed in one of the internal routers 18. The gateway routers 16 or the internal routers 18 may be configured to implement a firewall or other traffic filtering function that may be used to employ the inspection function of the present invention. Those skilled in the art will recognize that the inspection function and associated processing may be provided in virtually any type of entity within or between the packet networks 12 through which packet traffic will travel to set up and provide communication sessions.

In operation, the present invention will employ an inspection function to monitor packets being routed through the packet networks 12. Each packet will be inspected to identify packets carrying session initiation messages associated with select applications. Once a session initiation message has been identified, any number of actions may be taken alone or in combination. In a more basic embodiment, the session initiation messages are simply dropped, such that the intended communication session is prevented. In another embodiment, the identification of a session initiation message associated with a select application may dictate sending a notification to a reporting service 20 to record information pertaining to the attempt to establish the communication session from the select application. When session initiation messages associated with select applications are reported, the packet carrying the session initiation message may be dropped to prevent establishment of the communication session, or the session initiation message may be forwarded in traditional fashion to allow the communication session to be established. In yet another embodiment, the inspection function may take the necessary steps to have the communication session routed through a monitoring function, which may be provided by a proxy 22. As such, the communication session may be established through the proxy 22, such that the content of the communication session may be monitored with or without the knowledge of the communication clients 14 participating in the communication session.

Also illustrated in FIG. 1 is an illicit service server 24, which may support potentially illicit communication sessions by cooperating with the communication clients 14, such that the illicit communications are facilitated by or established through the illicit service server 24. Accordingly, the session initiation messages associated with select applications may be initiated directly or indirectly from the communication client 14, the illicit service server 24, or other associated communication entity.

Figure 2C:
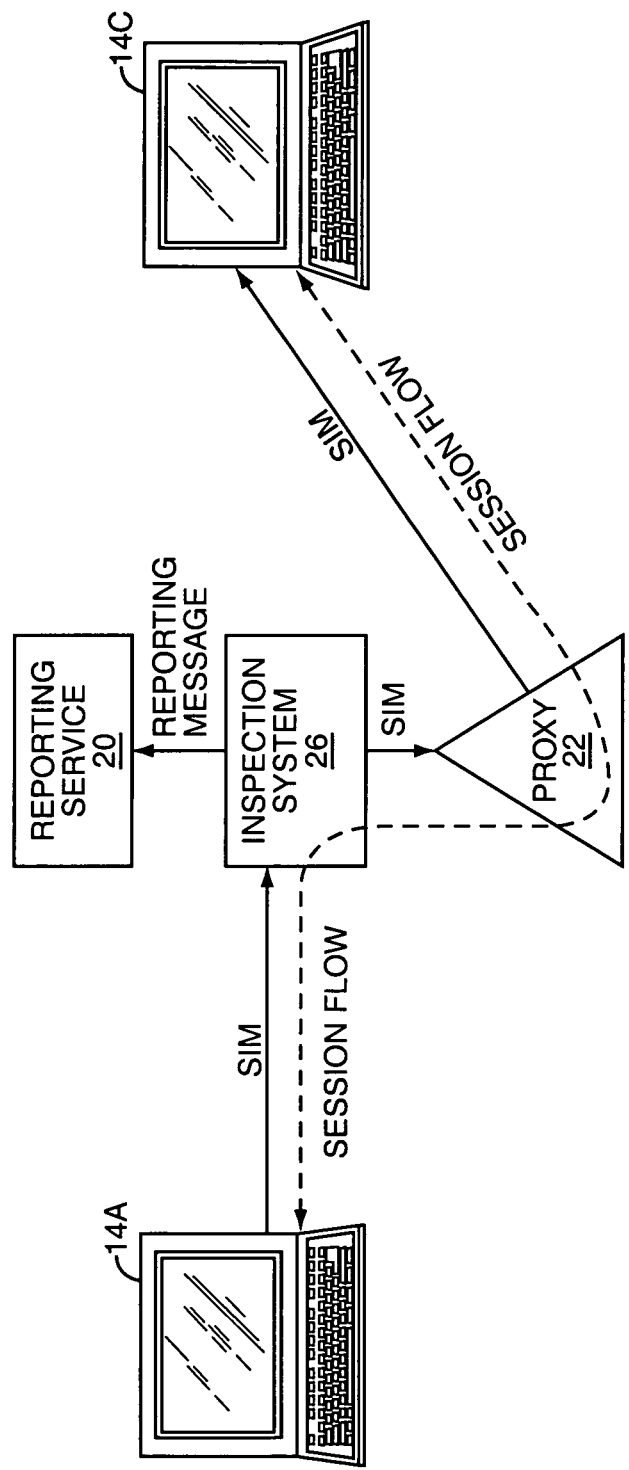

FIGS. 2A-2C provide functional illustrations of how packets are inspected to identify session initiation messages and the resulting processing once a session initiation message is identified. With reference to FIG. 2A, an inspection system 26 is used to inspect all packets routed therethrough. When communication client 14A initiates a communication session to communication client 14C using a select application, a session initiation message (SIM), such as a Session Initiation Protocol (SIP) Invite message, is sent toward communication client 14C. Assuming the SIM is embodied in a packet routed through the inspection system 26, the inspection system 26 will identify the packet as being one representing a SIM from a select application. In this embodiment, the inspection system 26 will simply drop the packet representing the SIM to prevent establishment of the desired communication session between communication clients 14A and 14C.

Turning now to FIG. 2B, when the inspection system 26 identifies a packet representing a SIM, a reporting message is sent to the reporting service 20 to provide the details associated with the SIM, as well as forwarding the SIM toward communication client 14C such that the communication session may be established and a session flow may take place between communication clients 14A and 14C. Accordingly, the inspection system 26 may monitor each of the packets within the session flow, as well as the session control messages used to establish the communication session. Those skilled in the art will recognize that additional control messages will be used to establish the communication sessions in traditional fashion. Certain or all of these control messages may represent a session initiation message.

With reference to FIG. 2C, the inspection system 26 is configured to identify a SIM, send a corresponding reporting message to the reporting service 20, and redirect the requested communication session to be established through a proxy 22, which will act as a monitoring device for the session initiation messages, session traffic, or a combination thereof. As such, the SIM may be forwarded to the proxy 22, which will forward the SIM to the intended communication client 14C, wherein a communication session is established through the proxy 22, inspection system 26, or both, such that the traffic creating the session flow in the communication session may be monitored. Those skilled in the art will recognize that the monitoring of the session traffic may take place at the proxy 22, the inspection system 26, or other monitoring entity through which the communication session is established. The proxy 22 may also act as a proxy in a traditional sense for handling session control messages. As such, the session control messages may be handled by the proxy 22, which will operate to establish the session between the communication clients 14 through an appropriate monitoring entity, which may be provided by the inspection system 26.

In another embodiment, the criteria used to determine which applications are the select applications for which SIMs should be processed may be updated periodically as the criteria change, new applications are discovered, or old applications should be removed from being considered the select applications. The updating process would be analogous to updates provided on a systematic basis for antivirus applications.

Figure 3:
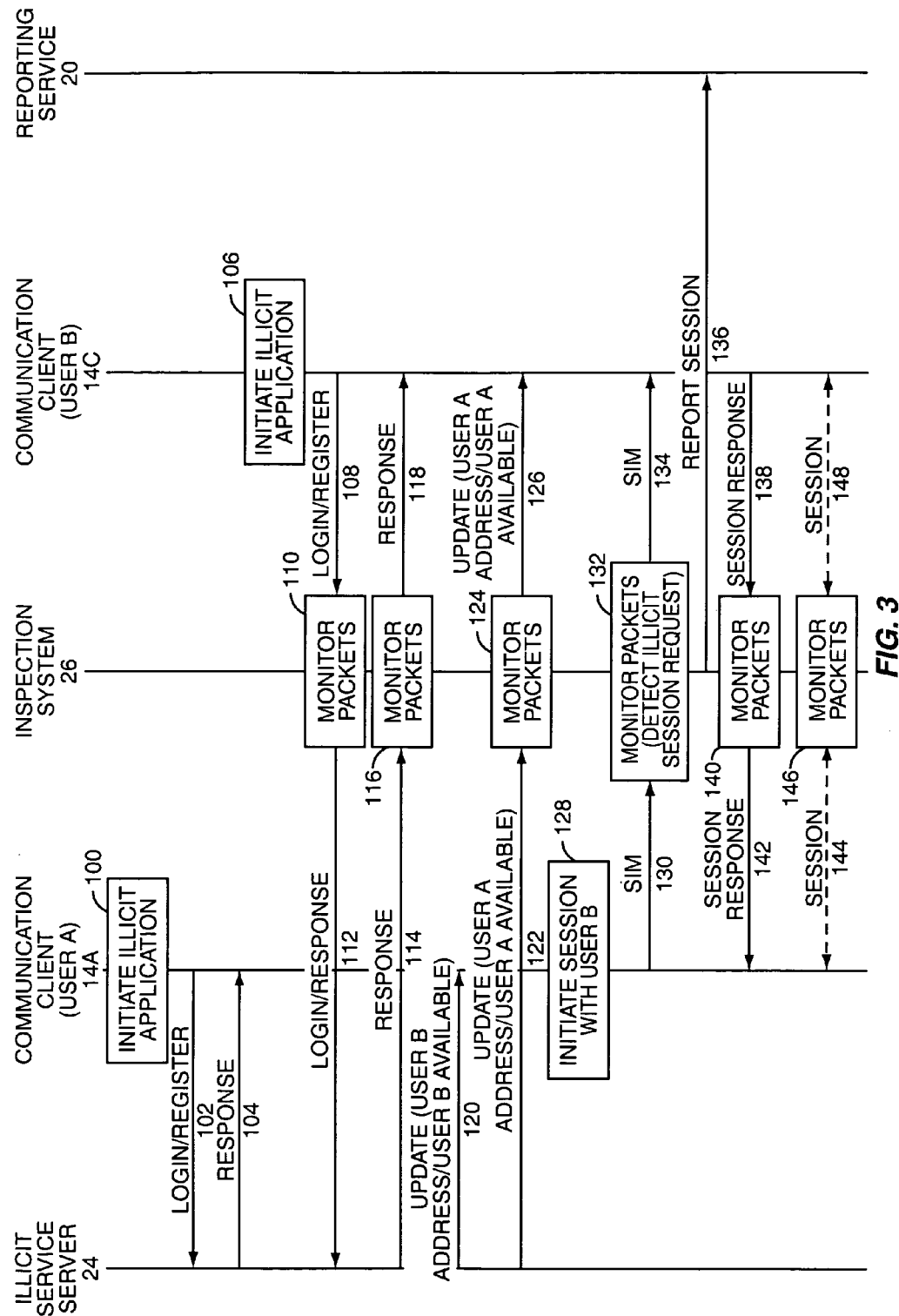
FIG. 3 is a communication flow diagram illustrating the process for detecting establishment of a communication session, which may be used to support illicit communications, according to one embodiment of the present invention.

Turning now to FIG. 3, a more detailed communication flow is provided to illustrate exemplary operation of the present invention according to one embodiment. Initially, assume communication client 14A, which is associated with User A, desires to establish a communication session with communication client 14C, which is associated with User B. Further assume that the application used for the communication session is an illicit application, which may be used to port a voice-over-packet communication session in which the voice traffic is encrypted using illegal encryption technology. Initially, User A will interact with communication client 14A to initiate the illicit application (step 100), which may log into or otherwise register with an illicit service server 24, which keeps an updated list of active or available users, which includes User B (step 102). The illicit service server 24 will allow User A to log in or otherwise register, and will send a response back to communication client 14A indicating that the login or registration process is complete (step 104).

Subsequently, communication client 14C will initiate the illicit application in response to instructions from User B (step 106). As such, communication client 14C will send a login or registration message toward the illicit service server 24 (step 108). The login or registration message may be forwarded through the inspection system 26, wherein the associated packet or packets are monitored (step 110) and routed toward the illicit service server 24 (step 112). The illicit service server 24 will log in or otherwise register User B and the associated communication client 14C and send a response back toward communication client 14C (step 114). The response may be monitored by the inspection system 26 (step 116) and routed to communication client 14C (step 118).

At this point, the illicit service server 24 may operate in a fashion similar to a text messaging service by providing information alerting the active users of other active users when a new person becomes active or an active person becomes inactive. As such, the illicit service server 24 may send an update to communication client 14A indicating that User B is available, and may also provide User B's address, which may be the IP address for communication client 14C (step 120). Similarly, the illicit service server 24 may send an update toward communication client 14C (step 122), wherein the update is monitored by the inspection system 26 (step 124) and forwarded to communication client 14C (step 126). At this point, User A is alerted that User B is active and available for communications, and User B is alerted that User A is active and available for communications. The respective communication clients 14A and 14C have the addresses of the respective communication clients 14C and 14A.

Next, assume User A initiates a communication session with User B (step 128). As such, communication client 14A will send a SIM toward communication client 14C (step 130). The SIM is represented by a packet routed through the inspection system 26, which will monitor all of the packets routed therethrough and will detect the SIM from communication 14A as being one from the illicit application, which is one of the select applications for monitoring (step 132). The inspection system 26 may forward the SIM to communication client 14C (step 134), as well as sending a reporting message to the reporting service 20 (step 136). The reporting message may identify the originating and terminating communication clients 14A and 14C, respectively, the application with which the communication session is associated, and any other information deemed appropriate for analyzing.

Communication client 14C will respond to the SIM by sending a session response toward communication client 14A (step 138). The session response will pass through the inspection system 26 where it is monitored (step 140), and is then forwarded to communication client 14A (step 142). At this point, a session is established between communication client 14A and communication client 14C through the inspection system 26, wherein the packets representing the information being transferred between communication clients 14A and 14C for the communication session are monitored (steps 144, 146, and 148). Notably, the SIM will generally include the address of the originating communication client 14A and any port and coding information for the communication session. Similarly, the session response may include the address of the terminating communication client 14C and any relevant port and coding information. As such, each of the communication clients 14 will have the necessary information to determine where and how to send packets to facilitate the communication session.

Turning now to FIG. 4, a block representation of an inspection system 26 is illustrated. The inspection system 26 may take any form, including one of the border routers 16 or internal routers 18, as well as any other entity that may implement a firewall, filter, or other packet processing or routing function. The inspection system 26 will generally include a control system 28 having memory 30 for storing the requisite software 32 and data 34 to facilitate the operation as described above. The control system 28 will also be associated with one or more packet communication interfaces 36 to facilitate any requisite routing or communication functions.

With reference to FIG. 5, a block representation of a proxy 22 is illustrated as including a control system 38 with memory 40. The memory 40 will include the requisite software 42 and data 44 to facilitate operation as described above. The control system 38 may also be associated with one or more packet communication interfaces 46 to facilitate the proxy functions, monitoring functions, communication functions, or any combination thereof as desired in the select configuration.

Those skilled in the art will recognize improvements and modifications to the preferred embodiments of the present invention. All such improvements and modifications are considered within the scope of the concepts disclosed herein and the claims that follow.

What is claimed is:
1. A packet inspection system comprising:
a) at least one packet-based communication interface;
b) a control system associated with the at least one packet-based communication interface and adapted to:

i) determine at least one select application to be monitored, wherein the at least one select application is potentially an illicit application from which communication sessions are actually or potentially unlawful or improper;
ii) monitor packets being routed;
iii) identify select ones of the packets representing session initiation messages associated with the at least one select application; and
iv) process the select ones of the packets according to defined criteria.

2. The packet inspection system of claim 1 wherein the defined criteria dictate that the select ones of the packets are dropped and the control system is further adapted to drop the select ones of the packets.

3. The packet inspection system of claim 1 wherein the defined criteria dictate that the select ones of the packets are routed toward their destination and the control system is further adapted to route the select ones of the packets.

4. The packet inspection system of claim 3 wherein the control system is further adapted to send reporting messages to a reporting service when the select ones of the packets are identified.

5. The packet inspection system of claim 1 wherein the control system is further adapted to send reporting messages to a reporting service when the select ones of the packets are identified.

6. The packet inspection system of claim 1 wherein the defined criteria dictate that the select ones of the packets are routed to a proxy for further processing and the control system is further adapted to route the select ones of the packets to the proxy.

7. The packet inspection system of claim 6 further comprising the proxy, which is adapted to route the select ones of the packets toward their destination such that traffic in resultant communication sessions can be monitored.

8. The packet inspection system of claim 1 wherein the control system is further adapted to monitor traffic in communication sessions associated with the session initiation messages.

9. The packet inspection system of claim 1 wherein the session initiation messages are intended to initiate packet-based communication sessions between at least two communication clients over a packet network through which the packets are routed.

10. The packet inspection system of claim 1 wherein the session initiation messages are session initiation protocol messages.

11. The packet inspection system of claim 10 wherein the session initiation protocol messages are invite messages.

12. The packet inspection system of claim 1 wherein the packet inspection system is a border gateway router.

13. The packet inspection system of claim 12 wherein the border gateway router is a national gateway router.

14. The packet inspection system of claim 12 wherein the border gateway router is an international gateway router.

15. The packet inspection system of claim 12 wherein the border gateway router is an enterprise gateway router.

16. The packet inspection system of claim 1 wherein the packet inspection system is a firewall.

17. The packet inspection system of claim 1 wherein the control system is further adapted to periodically receive information and update the defined criteria based on the information.

18. The packet inspection system of claim 1 wherein the at least one select application is an illicit application.

19. The packet inspection system of claim 1 wherein a session initiation message is configured to initiate a communication session for voice communications.

20. The packet inspection system of claim 1 wherein a session initiation message is configured to initiate a communication session for at least one of the group consisting of audio, video, and data communications.

21. A method for packet inspection comprising:
a) determining at least one select application to be monitored, wherein the at least one select application is potentially an illicit application from which communication sessions are actually or potentially unlawful or improper;
b) at a router, monitoring packets being routed;
c) at the router, identifying select ones of the packets representing session initiation messages associated with the at least one select application; and
d) processing, via the router, the select ones of the packets according to defined criteria.

22. The method of claim 21 wherein the defined criteria dictate that the select ones of the packets are dropped and further comprising dropping the select ones of the packets.

23. The method of claim 21 wherein the defined criteria dictate that the select ones of the packets are routed toward their destination and further comprising routing the select ones of the packets.

24. The method of claim 23 further comprising sending reporting messages to a reporting service when the select ones of the packets are identified.

25. The method of claim 21 further comprising sending reporting messages to a reporting service when the select ones of the packets are identified.

26. The method of claim 21 wherein the defined criteria dictate that the select ones of the packets are routed to a proxy for further processing and further comprising routing the select ones of the packets to the proxy.

27. The method of claim 26 wherein the proxy is adapted to route the select ones of the packets toward their destination such that traffic in resultant communication sessions can be monitored.

28. The method of claim 21 further comprising monitoring communication sessions associated with the session initiation messages.

29. The method of claim 21 wherein the session initiation messages are intended to initiate packet-based communication sessions between at least two communication clients over a packet network through which the packets are routed.

30. The method of claim 21 wherein the session initiation messages are session initiation protocol messages.

31. The method of claim 30 wherein the session initiation protocol messages are invite messages.

32. The method of claim 21 wherein the router is a border gateway router.

33. The method of claim 32 wherein the border gateway router is a national gateway router.

34. The method of claim 32 wherein the border gateway router is an international gateway router.

35. The method of claim 32 wherein the border gateway router is an enterprise gateway router.

36. The method of claim 21 wherein the router is provided in a firewall.

37. The method of claim 21 further comprising periodically receiving information and updating the defined criteria based on the information.

38. The method of claim 21 wherein the at least one select application is an illicit application.

39. The method of claim 21 wherein a session initiation message is configured to initiate a communication session for voice communications.

40. The method of claim 21 wherein a session initiation message is configured to initiate a communication session for at least one of the group consisting of audio, video, and data communications.

41. The packet inspection system of claim 1 wherein the control system is further adapted to determine the at least one select application to be monitored based on whether the at least one select application can be used for a communication session carrying traffic encrypted using illegal encryption technology.

42. The method of claim 21 wherein determining the at least one select application to be monitored is based on whether the at least one select application can be used for a communication session carrying traffic encrypted using illegal encryption technology.

* * * * *